United States Patent
Villadsen et al.

(10) Patent No.: US 8,793,706 B2
(45) Date of Patent: Jul. 29, 2014

(54) METADATA-BASED EVENTING SUPPORTING OPERATIONS ON DATA

(75) Inventors: Peter Villadsen, Sammamish, WA (US); Zhaoqi Chen, Bellevue, WA (US); Ramakanthachary S. Gottumukkala, Sammamish, WA (US); Marcos Calderon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 7 days.

(21) Appl. No.: 12/969,587

(22) Filed: Dec. 16, 2010

(65) Prior Publication Data

US 2012/0159516 A1   Jun. 21, 2012

(51) Int. Cl.
*G06F 3/00* (2006.01)

(52) U.S. Cl.
USPC ............................................. 719/318

(58) Field of Classification Search
None
See application file for complete search history.

(56) References Cited

U.S. PATENT DOCUMENTS

| | | | |
|---|---|---|---|
| 5,257,577 A | 11/1993 | Clark | |
| 5,594,660 A | 1/1997 | Sung et al. | |
| 5,606,609 A | 2/1997 | Houser et al. | |
| 5,790,789 A | 8/1998 | Suarez | |
| 5,845,289 A | 12/1998 | Baumeister et al. | |
| 5,848,404 A | 12/1998 | Hafner et al. | |
| 5,893,092 A | 4/1999 | Driscoll | |
| 5,933,645 A | 8/1999 | Wallack | |
| 5,933,851 A | 8/1999 | Kojima et al. | |
| 5,960,383 A | 9/1999 | Fleischer | |
| 6,012,053 A | 1/2000 | Pant et al. | |
| 6,014,138 A | 1/2000 | Cain et al. | |
| 6,032,196 A | 2/2000 | Monier | |
| 6,070,191 A | 5/2000 | Narendran et al. | |
| 6,078,743 A | 6/2000 | Apte et al. | |
| 6,098,064 A | 8/2000 | Pirolli et al. | |
| 6,108,661 A | 8/2000 | Caron et al. | |

(Continued)

FOREIGN PATENT DOCUMENTS

| | | |
|---|---|---|
| CN | 1568458 A | 1/2005 |
| CN | 1573757 A | 2/2005 |

(Continued)

OTHER PUBLICATIONS

"Event Handling", Retrieved at << http://swizframework.jira.com/wiki/display/SWIZ/Event+Handling >>, Jul. 9, 2010, pp. 4.

(Continued)

*Primary Examiner* — Emerson Puente
*Assistant Examiner* — Sisley Kim
(74) *Attorney, Agent, or Firm* — Damon Rieth; Jim Ross; Micky Minhas (57) ABSTRACT

Concepts and technologies are described herein for providing metadata-based eventing supporting operations on data. Application data such as classes and events can be stored in a table and can be associated with and/or described by application metadata. The application metadata also can specify one or more event handlers that reference one or more methods on a class. The event handlers can be invoked via various delegates linked to the one or more application metadata tables. When a create, update, or delete operation on the application data is received, the application metadata can be queried to determine if the application metadata describes event handlers associated with the application data. If event handlers associated with the application data exist, the event handlers can be invoked.

16 Claims, 5 Drawing Sheets

(56) References Cited

U.S. PATENT DOCUMENTS

| | | | |
|---|---|---|---|
| 6,125,361 A | 9/2000 | Chakrabarti et al. | |
| 6,128,701 A | 10/2000 | Malcolm et al. | |
| 6,145,003 A | 11/2000 | Sanu et al. | |
| 6,158,044 A | 12/2000 | Tibbetts | |
| 6,182,085 B1 | 1/2001 | Eichstaedt et al. | |
| 6,185,558 B1 | 2/2001 | Bowman et al. | |
| 6,233,726 B1 | 5/2001 | Bowman et al. | |
| 6,240,408 B1 | 5/2001 | Kaufman | |
| 6,247,013 B1 | 6/2001 | Morimoto | |
| 6,285,999 B1 | 9/2001 | Page | |
| 6,304,864 B1 | 10/2001 | Liddy et al. | |
| 6,317,741 B1 | 11/2001 | Burrows | |
| 6,336,211 B1 | 1/2002 | Soe | |
| 6,351,467 B1 | 2/2002 | Dillon | |
| 6,351,755 B1 | 2/2002 | Najork et al. | |
| 6,356,933 B2 | 3/2002 | Mitchell et al. | |
| 6,360,215 B1 | 3/2002 | Judd et al. | |
| 6,381,734 B1 | 4/2002 | Golde et al. | |
| 6,385,602 B1 | 5/2002 | Tso et al. | |
| 6,389,436 B1 | 5/2002 | Chakrabarti et al. | |
| 6,405,212 B1 | 6/2002 | Samu et al. | |
| 6,418,433 B1 | 7/2002 | Chakrabarti et al. | |
| 6,418,452 B1 | 7/2002 | Kraft et al. | |
| 6,418,453 B1 | 7/2002 | Kraft et al. | |
| 6,430,705 B1 | 8/2002 | Wisor et al. | |
| 6,442,606 B1 | 8/2002 | Subbaroyan et al. | |
| 6,442,620 B1 | 8/2002 | Thatte et al. | |
| 6,449,624 B1 | 9/2002 | Hammack et al. | |
| 6,484,204 B1 | 11/2002 | Rabinovich | |
| 6,484,276 B1 | 11/2002 | Singh et al. | |
| 6,539,376 B1 | 3/2003 | Sundaresan et al. | |
| 6,547,829 B1 | 4/2003 | Meyerzon et al. | |
| 6,549,897 B1 | 4/2003 | Katariya et al. | |
| 6,594,682 B2 | 7/2003 | Peterson et al. | |
| 6,598,051 B1 | 7/2003 | Wiener et al. | |
| 6,622,140 B1 | 9/2003 | Kantrowitz | |
| 6,625,804 B1 | 9/2003 | Ringseth et al. | |
| 6,631,497 B1 | 10/2003 | Jamshidi et al. | |
| 6,638,314 B1 | 10/2003 | Meyerzon et al. | |
| 6,668,370 B1 | 12/2003 | Harmon et al. | |
| 6,738,764 B2 | 5/2004 | Mao et al. | |
| 6,742,054 B1 | 5/2004 | Upton | |
| 6,745,388 B1 | 6/2004 | Gupta et al. | |
| 6,766,422 B2 | 7/2004 | Beyda | |
| 6,779,184 B1 | 8/2004 | Puri et al. | |
| 6,789,252 B1 | 9/2004 | Burke et al. | |
| 6,826,581 B2 | 11/2004 | Moslander et al. | |
| 6,850,922 B1 | 2/2005 | Wason | |
| 6,871,202 B2 | 3/2005 | Broder | |
| 6,883,135 B1 | 4/2005 | Obata et al. | |
| 6,886,010 B2 | 4/2005 | Kostoff | |
| 6,901,595 B2 | 5/2005 | Mukundan et al. | |
| 6,951,022 B1 * | 9/2005 | Golde et al. | 719/318 |
| 6,961,900 B1 | 11/2005 | Sprague et al. | |
| 7,016,540 B1 | 3/2006 | Gong et al. | |
| 7,028,029 B2 | 4/2006 | Kamvar et al. | |
| 7,062,502 B1 | 6/2006 | Kesler | |
| 7,072,934 B2 | 7/2006 | Helgeson et al. | |
| 7,076,483 B2 | 7/2006 | Preda et al. | |
| 7,080,073 B1 | 7/2006 | Jiang et al. | |
| 7,139,983 B2 | 11/2006 | Kelts | |
| 7,177,859 B2 | 2/2007 | Pather et al. | |
| 7,181,438 B1 | 2/2007 | Szabo | |
| 7,197,512 B2 | 3/2007 | Pharies et al. | |
| 7,203,678 B1 | 4/2007 | Petropoulos et al. | |
| 7,243,102 B1 | 7/2007 | Naam et al. | |
| 7,246,128 B2 | 7/2007 | Jordahl | |
| 7,281,002 B2 | 10/2007 | Farrell | |
| 7,293,253 B1 | 11/2007 | Soukup | |
| 7,328,401 B2 | 2/2008 | Obata et al. | |
| 7,472,375 B2 | 12/2008 | Ye et al. | |
| 7,472,401 B2 | 12/2008 | Luo et al. | |
| 7,490,214 B2 | 2/2009 | Cholleti et al. | |
| 7,690,000 B2 | 3/2010 | Farmer | |
| 7,711,688 B2 | 5/2010 | Plaisted et al. | |
| 7,971,194 B1 | 6/2011 | Gilboa | |
| 2001/0047385 A1 | 11/2001 | Tuatini | |
| 2002/0023261 A1 | 2/2002 | Goodwin et al. | |
| 2002/0066077 A1 | 5/2002 | Leung | |
| 2002/0078045 A1 | 6/2002 | Dutta | |
| 2002/0099694 A1 | 7/2002 | Diamond et al. | |
| 2002/0100017 A1 | 7/2002 | Grier et al. | |
| 2002/0103798 A1 | 8/2002 | Abrol et al. | |
| 2002/0107886 A1 | 8/2002 | Gentner et al. | |
| 2002/0129014 A1 | 9/2002 | Kim et al. | |
| 2002/0165903 A1 | 11/2002 | Zargham et al. | |
| 2002/0170036 A1 | 11/2002 | Cobb et al. | |
| 2002/0188869 A1 | 12/2002 | Patrick | |
| 2003/0037074 A1 | 2/2003 | Dwork et al. | |
| 2003/0037310 A1 | 2/2003 | Ge | |
| 2003/0055668 A1 | 3/2003 | Saran et al. | |
| 2003/0074368 A1 | 4/2003 | Schuetze et al. | |
| 2003/0101251 A1 | 5/2003 | Low | |
| 2003/0135384 A1 | 7/2003 | Nguyen | |
| 2003/0167229 A1 | 9/2003 | Ludwig et al. | |
| 2003/0182452 A1 | 9/2003 | Upton | |
| 2003/0217052 A1 | 11/2003 | Rubenczyk et al. | |
| 2003/0221165 A1 | 11/2003 | Young et al. | |
| 2003/0233477 A1 | 12/2003 | Ballinger et al. | |
| 2004/0056894 A1 | 3/2004 | Zaika et al. | |
| 2004/0068728 A1 | 4/2004 | Blevins | |
| 2004/0093581 A1 | 5/2004 | Nielsen et al. | |
| 2004/0181515 A1 | 9/2004 | Ullmann et al. | |
| 2004/0181534 A1 | 9/2004 | Mortensen et al. | |
| 2004/0186764 A1 | 9/2004 | McNeill | |
| 2004/0194069 A1 | 9/2004 | Surasinghe | |
| 2004/0199497 A1 | 10/2004 | Timmons | |
| 2004/0230572 A1 | 11/2004 | Omoigui | |
| 2004/0254932 A1 | 12/2004 | Gupta et al. | |
| 2005/0015619 A1 | 1/2005 | Lee | |
| 2005/0044071 A1 | 2/2005 | Cho et al. | |
| 2005/0055347 A9 | 3/2005 | Cho et al. | |
| 2005/0071328 A1 | 3/2005 | Lawrence | |
| 2005/0071741 A1 | 3/2005 | Acharya et al. | |
| 2005/0086192 A1 | 4/2005 | Kodama | |
| 2005/0086206 A1 | 4/2005 | Balasubramanian et al. | |
| 2005/0086583 A1 | 4/2005 | Obata et al. | |
| 2005/0091576 A1 | 4/2005 | Relyea et al. | |
| 2005/0108699 A1 | 5/2005 | Olander et al. | |
| 2005/0132276 A1 | 6/2005 | Panditharadhya et al. | |
| 2005/0138013 A1 | 6/2005 | Walker et al. | |
| 2005/0144162 A1 | 6/2005 | Liang | |
| 2005/0154746 A1 | 7/2005 | Liu et al. | |
| 2005/0154812 A1 | 7/2005 | DeWitt et al. | |
| 2005/0165781 A1 | 7/2005 | Kraft et al. | |
| 2005/0166187 A1 | 7/2005 | Das et al. | |
| 2005/0187965 A1 | 8/2005 | Abajian | |
| 2005/0192936 A1 | 9/2005 | Meek et al. | |
| 2005/0192955 A1 | 9/2005 | Farrell | |
| 2005/0203956 A1 | 9/2005 | Dweck et al. | |
| 2005/0240580 A1 | 10/2005 | Zamir et al. | |
| 2005/0262050 A1 | 11/2005 | Fagin et al. | |
| 2005/0267765 A1 | 12/2005 | Jeng et al. | |
| 2006/0047649 A1 | 3/2006 | Liang | |
| 2006/0064425 A1 | 3/2006 | Kakivaya et al. | |
| 2006/0101445 A1 | 5/2006 | Carbajales et al. | |
| 2006/0150148 A1 | 7/2006 | Beckett et al. | |
| 2006/0161906 A1 | 7/2006 | Becker et al. | |
| 2006/0179082 A1 * | 8/2006 | Boyd et al. | 707/203 |
| 2006/0195453 A1 | 8/2006 | Plaisted et al. | |
| 2006/0294509 A1 | 12/2006 | Mital et al. | |
| 2007/0038616 A1 | 2/2007 | Guha | |
| 2007/0074121 A1 | 3/2007 | Mullender et al. | |
| 2007/0130205 A1 * | 6/2007 | Dengler et al. | 707/104.1 |
| 2007/0186211 A1 | 8/2007 | Crasovan et al. | |
| 2007/0233500 A1 | 10/2007 | Skunberg | |
| 2009/0070765 A1 | 3/2009 | Alves et al. | |
| 2009/0182610 A1 | 7/2009 | Palanisamy et al. | |
| 2012/0144367 A1 | 6/2012 | Villadsen et al. | |
| 2012/0159429 A1 | 6/2012 | Villadsen et al. | |

(56) References Cited

U.S. PATENT DOCUMENTS

FOREIGN PATENT DOCUMENTS

| | | |
|---|---|---|
| CN | 1648865 A | 8/2005 |
| CN | 101322096 A | 12/2008 |
| CN | 101326515 A | 12/2008 |
| EP | 0950961 A2 | 10/1999 |
| EP | 1050830 A2 | 11/2000 |
| EP | 1120717 A2 | 8/2001 |
| EP | 1376337 | 1/2004 |
| EP | 1594049 | 11/2005 |
| JP | 10-091638 | 4/1998 |
| JP | 11-328191 A | 11/1999 |
| WO | WO 99/61983 | 12/1999 |
| WO | WO 00/57339 | 9/2000 |
| WO | WO 2005/069125 | 7/2005 |
| WO | WO 2006017418 A2 | 2/2006 |

OTHER PUBLICATIONS

"EVT_EVENT_METADATA_PROPERTY_ID", Retrieved at << http://msdn.microsoft.com/en-us/library/aa385517%28VS.85%29.aspx >>, Aug. 26, 2010, pp. 3.
"Using Metadata Tags in Components", Retrieved at << http://flex3.info/using-metadata-tags-in-components/ >>, Retrieved Date: Oct. 6, 2010, pp. 6.
Brown, et al., "Events in Windows Vista", Retrieved at << http://msdn.microsoft.com/en-us/magazine/cc163431.aspx >>, May 2007, pp. 7.
"Getting Information About Event Notifications", Retrieved at << http://msdn.microsoft.com/en-us/library/ms189332.aspx >>, Retrieved Date: Oct. 6, 2010, p. 1.
"Metadata Driven User Interface", U.S. Appl. No. 11/418,829, filed May 5, 2006, pp. 33.
"Pluggable Business Logic", U.S. Appl. No. 11/363,132, filed Feb. 27, 2006, pp. 15.
U.S. Official Action dated Jan. 17, 2014 in U.S. Appl. No. 12/968,434.
U.S. Official Action dated in Jun. 21, 2013 U.S. Appl. No. 12/968,434.
U.S. Official Action dated Dec. 2, 2008 in U.S. Appl. No. 11/418,829.
U.S. Official Action dated Jul. 13, 2009 in U.S. Appl. No. 11/418,829.
U.S. Official Action dated Dec. 17, 2009 in U.S. Appl. No. 11/418,829.
U.S. Official Action dated Jul. 20, 2010 in U.S. Appl. No. 11/418,829.
U.S. Official Action dated Mar. 1, 2011 in U.S. Appl. No. 11/418,829.
U.S. Notice of Allowance dated Sep. 19, 2011 in U.S. Appl. No. 11/418,829.
U.S. Official Action dated Jun. 18, 2010 in U.S. Appl. No. 11/363,132.
U.S. Notice of Allowance dated Oct. 6, 2010 in U.S. Appl. No. 11/363,132.
International Search Report dated Jun. 25, 2012 in International Application No. PCT/US11/061700.
Chinese Official Action dated Oct. 9, 2013 in Chinese Application No. CN 201110443176.0.
U.S. Official Action dated Apr. 5, 2006 in U.S. Appl. No. 10/981,962.
U.S. Official Action dated Sep. 21, 2006 in U.S. Appl. No. 10/981,962.
U.S. Official Action dated Apr. 30, 2007 in U.S. Appl. No. 10/981,962.
U.S. Official Action dated Mar. 17, 2008 in U.S. Appl. No. 10/981,962.
U.S. Official Action dated Oct. 16, 2006 in U.S. Appl. No. 10/804,326.
U.S. Official Action dated Dec. 11, 2007 in U.S. Appl. No. 10/804,326.
U.S. Official Action dated Nov. 3, 2006 in U.S. Appl. No. 10/955,462.
U.S. Official Action dated May 11, 2007 in U.S. Appl. No. 10/955,462.
U.S. Official Action dated Sep. 10, 2007 in U.S. Appl. No. 10/955,462.
U.S. Official Action dated Mar. 22, 2007 in U.S. Appl. No. 10/955,983.
U.S. Official Action dated Nov. 13, 2007 in U.S. Appl. No. 10/955,983.
U.S. Official Action dated Jun. 20, 2007 in U.S. Appl. No. 11/019,091.
U.S. Official Action dated Apr. 3, 2008 in U.S. Appl. No. 11/019,091.
U.S. Official Action dated Jan. 8, 2008 in U.S. Appl. No. 11/238,906.
European Search Report dated Jul. 26, 2002 in European Application No. EP 00309121.
European Official Action dated Jul. 4, 2003 in Application No. EP 00309121.
European Official Action dated Jun. 16, 2004 in Application No. EP 00309121.
European Official Action dated Feb. 8, 2007 in Application No. EP 00309121.
European Search Report dated Jan. 17, 2006 in European Application No. EP 05105048.
European Search Report dated Aug. 11, 2006 in European Application No. EP 05105110.
"Add and remove event handlers dynamically in .NET", Published on: Oct. 7, 2010, Available at: http://www.lhescarms.com/dotnel/EventHandler.aspx, 3 pp.
"Callout Model", Published on: Oct. 4, 2010, Available at: http://msdn.microsoft.com/en-us/library/aa680673.aspx, 3 pp.
"Eventing Architecture", Published on: Oct. 4, 2010, Available at: http://msdn.microsoft.com/en-us/library/ms481 079(office.12).aspx, 7pp.
"Extending Runtime Editing Capabilities Using Oracle Composer", Published on: Oct. 7, 2010, available at: http://sqltech.cl/doc/oasllgRII webcenter.IIII/el0148/jpsdg_page_editor_adv.htm, 28 pp.
"WebSphere sMash configuration file: zero.config", Published on: Oct. 4, 2010, Available at: http://www.projectzero.org/sMash/1.1.x1docs/zero.devguide.doc/zero.core/Config.html, 5 pp.
jQuery Project, JQuery API, Feb. 21,2010, Available at: http://web.archive.org/web/201 00221 063651 /http://api.jquery.com/delegate/.
"Migrating from ASP.NET 1.X to ASP.NET 2.0," Published on Dec. 9, 2005, Microsoft Corporation, Available at: http://download.microsoft.com/download/el1/e/e1e86586-a01 e-41 e9-91 a9-6a12ded994e4/2005-03-02 MovinQ from ASPNET 11 to ASPNET20.ppt., 9 pp.
"Migrating from In-house Proprietary FIX Engine to CameronFIX," Published on Dec. 9, 2005, Cameron Systems, Available at: http://www/cameronsystems.com/solutions/migration.html., 6 pp.
"Using WebLogic's Distributed Server-side Beans," SEA Systems, Inc. 2000, http://www.inf.fuberlindellehre/wSOO/SWT/SENdocumentation/docs51/classdocsIAPIbean.html.
"SourceForge.net: Fasttrack," OSTG Open Source Technology Group, 2005, http://sourceforge.neUprojects/fasttrack/.
Gamma et al., "Design Patterns: Elements of Reusable Object-Oriented Software," Addison Wesley Longman, Inc. 1995. pp. 315-323.
Hecke, Peter, "Plug-ins, Part 1: The Big Picture", Published on: Jan. 2009, Available at: http://msdn.microsoft.com/en-us/library/dd393303.aspx, 8 pp.
Meszaros et al., "Visual Specification of a DSL Processor Debugger", Published on: Oct. 1, 2010, Available at: http://www.dsmforum.org/ eventsIDSM08/Papers/12-Meszaros.pdf, 6 pp.
Stewart, Ryan, "Getting Code Completion on Custom Events in Flex with the Event Metadata Tag", Published on: Jan. 10, 2009, Available at: http://blog.digitalbackcountry.com/2009/0 1 /getting-code-completion-on-custom-events-ftex-with-the-event-metadata-tag, 6 pp.
Najork, et al., "Breadth-First Crawling Yields High-Quality Pages", ACM, Compaq Systems Research Center, Hong Kong, 2001, pp. 114-118.
Cho et al., "Efficient Crawling Through URL Ordering", In Proceedings of the 7th International World Wide Web Conference, Apr. 1998, pp. 161-180.

(56) References Cited

OTHER PUBLICATIONS

Chakrabarti, S., "Recent Results in Automatic Web Resource Discovery", Dec. 1, 1999 ACM Computing Surveys, vol. 31, No. 4es, 7 pp.

Lam et al., "Automatic Document Classification Based on Probabilistic Reasoning: Model and Performance Analysis", IEEE, 1997, pp. 2719-2723. Abstract only.

Lee, J.K. W. et al., "Intelligent Agents for Matching Information Providers and Consumers on the World-Wide Web", IEEE, 1997, pp. 189-199. Abstract only.

Huang et al., "Design and Implementation of a Chinese Full-Text Retrieval System Based on Probabilistic Model", IEEE, 1993, pp. 1090-1093. Abstract only.

Yuwono, et al., "Search and Ranking Algorithms for Locating Resources on the World Wide Web", 1996, IEEE, *Proceedings of the 12th International Conference*, pp. 164-170.

Davis, Harold, "Create Custom class interfaces in .NET," Published on: Jan. 16, 2003, Harold Davis.pdf, Available at: http:/www.builderau.com.au/strategy/architecture/soa/Creat-custom-class-interfaces-in-, 6 pp.

O'Reily, "Constraints", Published on: Nov. 23, 2005, O'Reilly.pdf, 6 pp.

Laurie, Jonathan, "Sort Arrays easily and efficiently in .NET", Published on: May 22, 2003, Jonathan.pdf, Available at: www.builderau.com.au/program/windows/soa/Sort-arrrays-easily-and-efficiently-in-, 4 pp.

Swartz, Fred, "Equality Comparison," Published on: Dec. 18, 2005, Available at: http://web.archive.org/web/20051218010445/http:/leepoint.net/notes-java/data/expression . . . , 2 pp.

Bracha, G., "Generics in the Java Programming Language," Published on: Jul. 5, 2004, 23 pp.

"Generics," Sun Microsystems, Inc. 2004, Published on: Dec. 27, 2005, Available at: http://java.sun.com/j2se/1.5.0/docs/guide/language/generics.html, 3 pp.

"Introduction to. Generics (C#. Programming Guide)," Published on Dec. 27, 2005, Available at: http://msdn2.microsoft.ciom/library(d-=printer)/0x6a29h6.aspx, 2 pp.

Obasanjo, Dare, "XML Serialization in the .NET Framework," Published on: Jan. 23, 2003, Microsoft Corp. Available at: http://msdn.microsoft.cinm/en-us/library/ms950721(printer).aspx, 9 pp.

Obasanjo, Dare, "Designing Extensible, Versionable XML Formats," Published on: Jul. 15, 2004, Available at: http:msdn.microsoft.com/en-us/library/ms950793(printer).aspx, 19 pp.

Williams, et al., "Enabling Adaptive Enterprise Services Oriented Architectures with Distributed Object-Oriented Middleware," 2002, *Proceedings of CIC2002: 3rd International Conference on Communications in Computing*, pp. 242-249.

Karastoyanova et al., "Extending Web Service Flow Models to Provide for Adaptability," 2004, *Proceedings of OOPSLA*, vol. 4, 15pp.

Piccinelli et al., "Service-oriented Modelling for e-Business Applications Components," 2001, IEEE, *Proceedings Tenth IEEE International Workshops on Enabling Technologies: Infrastructure for Collaborative Enterprises*, 5 pp.

Kreger, "Web Services Conceptual Architecture (WSCA 1.0)," May 2001, IBM Corporation, 41 pp.

Petroutsos, Evangelos, "Store and Retrieve XML-based Business Object with SQL server and .NET," Published on: Aug. 20, 2003, Jupitermedia Corp. Available at: http://web.archive.org/web/20030820201718/http://www.devx.com/, 7 pp.

Chinese Official Action dated Sep. 25, 2009 in Chinese Application No. 200680045521.2.

Chinese Official Action dated Apr. 13, 2010 in Chinese Application No. 200680045521.2.

Chinese Official Action dated Sep. 21, 2010 in Chinese Application No. 200680045521.2.

Chinese Official Action dated Mar. 5, 2014 in Chinese Application No. CN 201110443176.0.

Chinese Official Action dated Mar. 5, 2014 in Chinese Application No. CN 201110416404.5.

Chinese Official Action dated Mar. 11, 2014 in Chinese Application No. 201110440149.8.

* cited by examiner

METADATA-BASED EVENTING SUPPORTING OPERATIONS ON DATA

BACKGROUND

The use and reach of software continues to increase as new software uses and purposes are addressed. As more aspects of personal and professional lives are addressed by software, interactions between various software packages may become more important. Furthermore, users or other entities may wish to associate events in one software package or environment other actions or events. Thus, users or other entities may wish to tailor software packages to work with and/or react to information from other software packages and/or changes in objects or program data of other software packages, for example.

Changes to programs and program objects may be difficult to recognize and/or communicate to another software package, and/or may require alteration of code associated with the program and/or program objects. As complex software packages interact to provide functionality associated with various aspects of users' business and personal needs, the inability to communicate between two or more software packages may limit various interactions between the software, and/or may negatively impact the overall usefulness of a user or entities software library.

It is with respect to these and other considerations that the disclosure made herein is presented.

SUMMARY

Concepts and technologies are described herein for providing metadata-based eventing supporting operations on data. In accordance with the concepts and technologies disclosed herein, information describing application data artifacts such as classes and events is stored in a table and is thus described by and/or associated with application metadata. The application metadata can include information specifying one or more event handlers associated with the application data. The event handlers can reference one or more methods on a class, and can be invoked via various delegates linked to one or more consumers. According to various embodiments, when a create, update, or delete ("CUD") operation on the application data is received, the application metadata is queried to identify event handlers associated with the application data.

The event handlers can be tailored by a user or other entity to perform particular functionality when the event handlers are invoked. Thus, for example, when a record in a table corresponding to the application data is created, updated, or deleted, an event handler associated with the table can be invoked. The event handlers can cause various devices to call one or more methods. Thus, various actions can be taken when the application data is modified via invoking the event handlers associated with the application data.

According to one aspect, a server computer executes a server application for providing functionality associated with the server computer. The server application generates and stores application data and/or application metadata. A client communicates with the server computer to access the functionality associated with the server application. As operations are submitted to the server computer, the application data may be modified via one or more CUD operations on the application data. The server application also can be used to tailor and store one or more event handlers in the application metadata. In some embodiments, a user interface ("UI") for creating event handlers is presented by the server application.

The server application can be configured to detect changes made to the application data. For example, the server application can be configured to detect a create, update, or delete operation executed on the application data to modify one or more records of the application data. If changes are made to the application data, the server application can query the application metadata to determine if any event handlers linked to the application data exist in the application metadata. The event handlers can be tailored by users or other entities to allow software or other entities to subscribe for published changes made to the application data. Event handlers linked to the application data can be invoked in a particular order, if appropriate. When invoked, the event handlers can execute one or more methods referenced by the event handlers.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for providing metadata-based eventing supporting operations on data. According to the concepts and technologies described herein, application artifacts such as classes and events can be stored in a table and can be associated with and/or described by application metadata. The application metadata also can specify one or more event handlers that reference one or more methods on a class. The event handlers can be invoked via various delegates linked to the one or more application metadata tables. The event handlers can be invoked when create, update, or delete operations on the application data are executed. The event handlers can prompt execution of one or more methods, and can be invoked sequentially. As such, methods executed via invoking the event handlers can be executed in a particular order.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for providing metadata-based eventing supporting operations on data will be presented.

Figure 1:
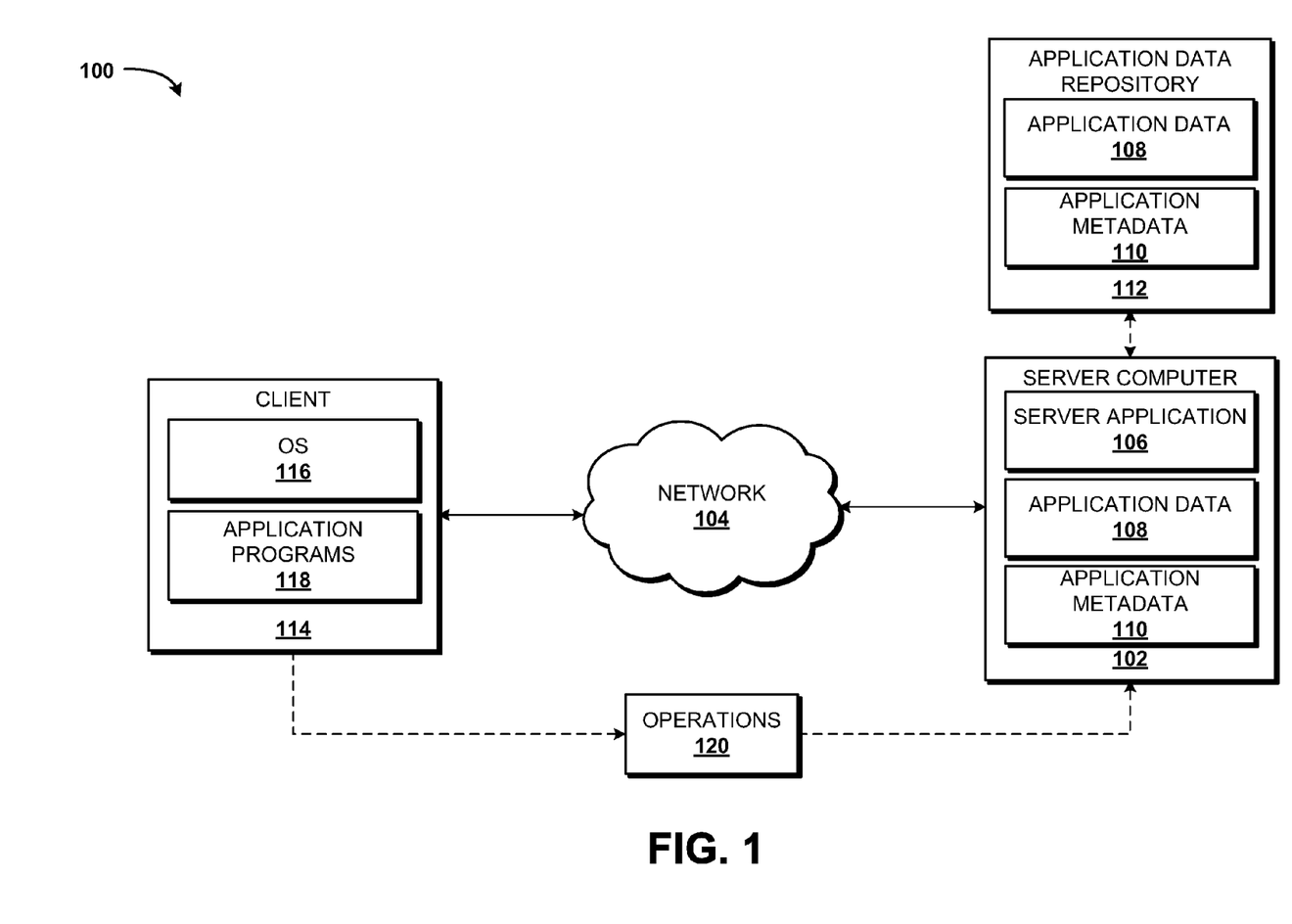
FIG. 1 is a system diagram illustrating an exemplary operating environment for the various embodiments disclosed herein.

Referring now to FIG. 1, aspects of one operating environment 100 for the various embodiments presented herein will be described. The operating environment 100 shown in FIG. 1 includes a server computer 102 operating on or in communication with a network 104. The server computer 102 is configured to execute an operating system (not illustrated in FIG. 1) and one or more application programs such as, for example, a server application 106 and/or other application programs. The operating system is a computer program for controlling the operation of the server computer 102 and the server application 106 is an executable program configured to execute on top of the operating system to provide functionality described herein for providing metadata-based eventing supporting operations on data.

The server application 106 is configured to generate, conduct operations on, cache, and/or store application data 108 at the server computer 102 and/or at a data storage location in communication with the server computer 102. The application data 108 can be generated by one or more users or other entities communicating with the server computer 102 via one or more interfaces, and/or via other processes. The application data 108 can be stored, for example, in a table. The server application 106 also is configured to generate, conduct operations on, cache, and/or store application metadata 110. According to various embodiments, the application data 108 includes data used by the server application 106 to provide functionality associated with the server computer 102. In the case of a customer relationship management ("CRM") application, for example, the application data 108 can include tables of customer data that include customer names and associated contact information as well as other data. It should be understood that this embodiment is illustrative, and should not be construed as being limiting in any way.

The application metadata 110 includes information describing various aspects of the application data 108. Additionally, in various implementations the server application 106 corresponds to software associated with a model-based environment. The models, included in the application data 108 illustrated in FIG. 1, can be described and persisted in a storage location as the application metadata 110. As such, the application metadata 110 can be interpreted by the server application 106. The application metadata 110 includes information describing one or more events associated with the server application 106 and/or the application data 108. Thus, it will be appreciated that the application metadata 110 can be interpreted by the server application 106 and/or other authorized entities to determine scope and details associated with models and/or events implemented by the server application 106.

In some embodiments, the application data 108 is published according to a publish and subscribe model, wherein software can subscribe to receive notifications that changes have occurred in the application data 108. According to various implementations, when changes are made to the application data 108, the server application 106 can be configured to query the application metadata 110 to determine if any event handlers associated with the application data 108 exist in the application metadata 110. As will be explained in more detail herein, if any event handlers exist in the application metadata 110, the event handlers can be invoked.

According to various implementations, the server application 106 is configured to store the application data 108 and/or the application metadata 110 in an application data repository 112. As illustrated in FIG. 1, the application data repository 112 can be in communication with the server computer 102 via a direct link. It should be understood, however, that the application data repository 112 can communicate with the server computer 102 via one or more network connections (not shown). Thus, the server computer 102 can communicate with the application data repository 112 via the network 104 and/or via other networks and/or communication links.

The functionality of the application data repository 112 can be provided by one or more databases, memory devices, mass storage devices, server computers, desktop computers, mobile telephones, laptop computers, other computing systems, and the like. In the illustrated embodiments, the functionality of the application data repository 112 is provided by a database communicatively linked to the server computer 102. It should be understood that this embodiment is illustrative, and should not be construed as being limiting in any way.

According to various embodiments, the operating environment 100 includes a client 114 configured to communicate with the server computer 102. The functionality of the client 114 can be provided by a personal computer ("PC") such as a desktop, tablet, or laptop computer system. The functionality of the client 114 also can be provided by other types of computing systems including, but not limited to, server computers, handheld computers, netbook computers, embedded computer systems, personal digital assistants, mobile telephones, smart phones, or other computing devices. The client 114 is configured to execute an operating system 116 ("OS") and one or more application programs 118.

The OS 116 is a computer program for controlling the operation of the client 114 and the application programs are executable programs configured to execute on top of the OS 116 to provide various functionality. In some embodiments, the client 114 interfaces with the server computer 102 via one or more application programming interfaces ("APIs"). For example, the client 114 can interface with the server computer 102 via a web-based API accessed via a traditional web browser or other web-enabled application program 118. It should be understood that this embodiment is illustrative, and should not be construed as being limiting in any way.

The client 114 is configured to interact with the server application 106. For example, the client 114 can be configured to generate and submit one or more operations 120 to the server application 106. The operations 120 can be submitted to the server computer 102 and interpreted by the server application 106 to support various interactions between the client 114 and the server application 106. In various embodiments, the operations 120 can include data corresponding to one or more queries of the application data 108, create, update, or delete operations on the application data 108, and the like. The operations 120 can be generated by the client 114 and/or by the server application 106 via interactions with the client 114. In some implementations, the operations 120 are generated by the server application 106 in response to interactions with the client 114 via UIs, exposed APIs, and/or other means. In some embodiments, a user or other entity interacts with the one or more UIs to generate the operations 120.

As explained above, the application metadata 110 can describe event handlers associated with the operations performed on application data 108. In some embodiments, for example, operations 120 on the application data 108 are associated with and/or tied to event handlers described by the application metadata 110. The server application 106 can be configured to query the application metadata 110 in response to operations 120 on the application data 108 to identify and invoke the event handlers associated with the operations 120 on the application data 108. Thus, changes to the application data 108 may, via querying of the application metadata 110 and the identification and invoking of event handlers described thereby, trigger various events defined by the event handers, which are described by the application metadata 110.

FIG. 1 illustrates one server computer 102, one network 104, one application data repository 112, and one client 114. It should be understood, however, that some implementations of the operating environment 100 include multiple server computers 102, multiple networks 104, multiple application data repositories 112, and/or multiple clients 114. Thus, the illustrated embodiments should be understood as being exemplary, and should not be construed as being limiting in any way.

Figure 2:
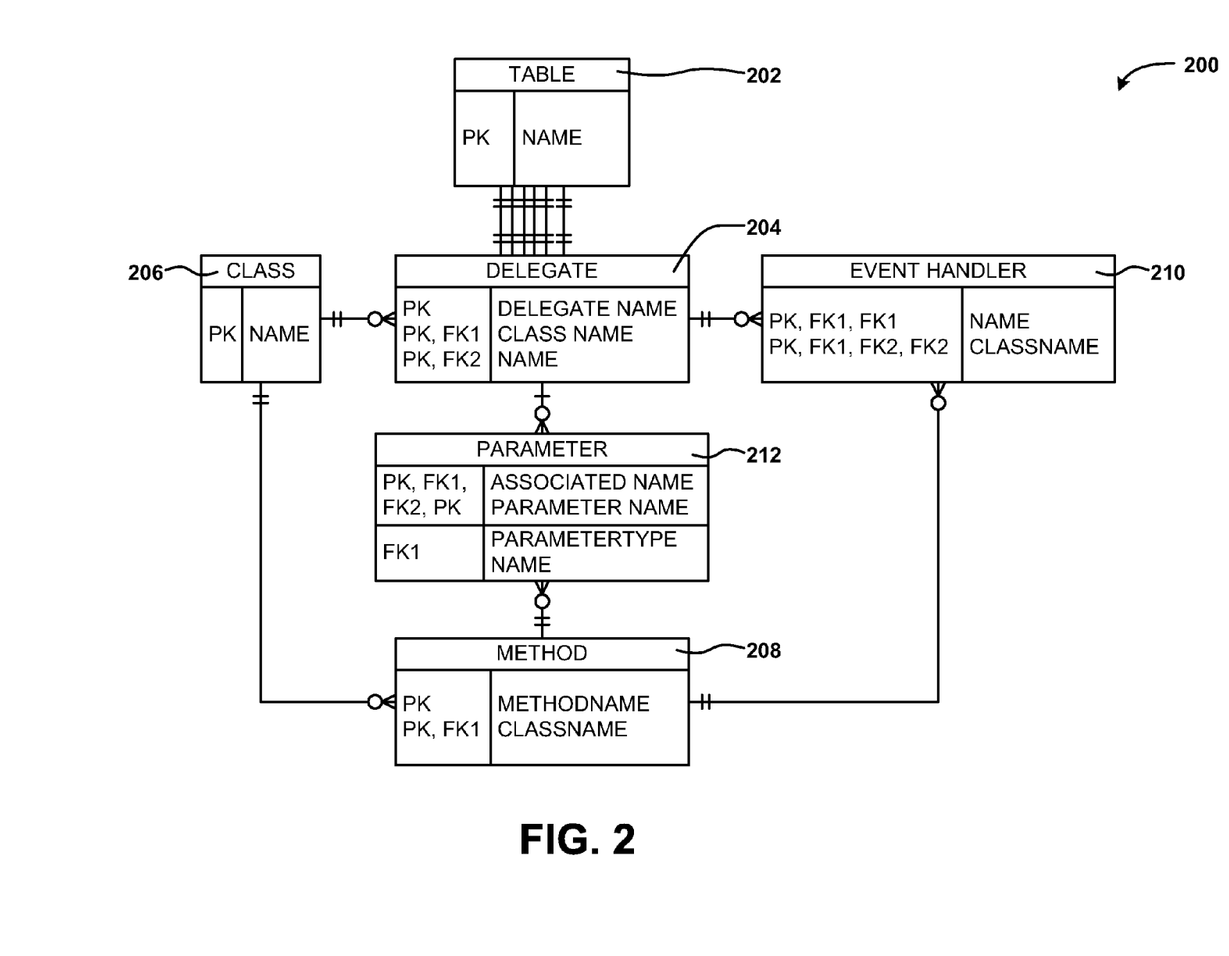
FIG. 2 is a data structure diagram that schematically illustrates a data structure for application metadata, according to an exemplary embodiment.

Turning now to FIG. 2, additional aspects of the application metadata 110 are described in additional detail, according to exemplary embodiments. In particular, FIG. 2 is a Unified Modeling Language (UML) diagram illustrating a data structure 200 for the application metadata 110. It should be understood that the illustrated data structure 200 is exemplary, and should not be construed as being limiting in any way. The data structure 200 includes a table 202 corresponding to the application data 108. As illustrated in FIG. 2, the table 202 can include a primary key corresponding to a name of the table, though this is not necessarily the case. Thus, the table 202 can be uniquely identified by its name.

According to various embodiments, the table 202 includes references to one or more delegates 204. The delegates 204 can be uniquely identified by a name, illustrated in FIG. 2 as "DelegateName." The delegates 204 also can be referenced by one or more classes 206. The classes 206 can be uniquely identified by a name. In addition to including references to the delegates 204, the classes 206 also can reference one or more methods 208. The methods 208 and the delegates 204 can include one or more references to one or more event handlers 210. The event handlers 210 include references to the classes 206 and the table 202. According to various embodiments, the event handlers 210 are used to invoke various methods 208 upon changes to one or more records in the table 202.

When an operation 120 is received by the server application 106, the server application 106 can create, update, or delete one or more records associated with the application data 108. According to implementations, the server application 106 performs a CUD operation on the table 202 to reflect changes associated with the operation 120. One or more event handlers are tied to the table 202 such that changes to the table 202, which includes one or more references to the delegates 204, can trigger one or more methods 208. The methods 208 can be invoked via one or more event handlers 210, which may be referenced by the delegates 204. Thus, it should be appreciated that CUD operations on the application data 108 can be tied to any number of event handlers. Thus, for example, actions can be taken and one or more subscribers can be notified if one or more records of the application data 108 is created, updated, or deleted. Although not described in detail with reference to FIG. 2, it should be understood that each of the delegates 204 and the methods 208 can include references to one or more parameters 212.

Although not explicitly shown in FIG. 2, in an exemplary embodiment, the delegates 204 include a pre-create delegate, a post-create delegate, a pre-update delegate, a post-update delegate, a pre-delete delegate, and a post-delete delegate. Each of the delegates 204 can include one or more referenced event handlers 210, wherein each event handler can reference one or more methods 208 on a class 206. Thus, it will be appreciated that various methods 208 can be invoked before or after CUD operations on the table 202. Furthermore, as will be described in more detail herein with reference to FIG. 4, the event handlers 210 can be invoked in a particular order. Thus, any number of methods 208 can be performed, and/or can be performed in a particular order, in response to a CUD operation on the table 202.

Figure 3:
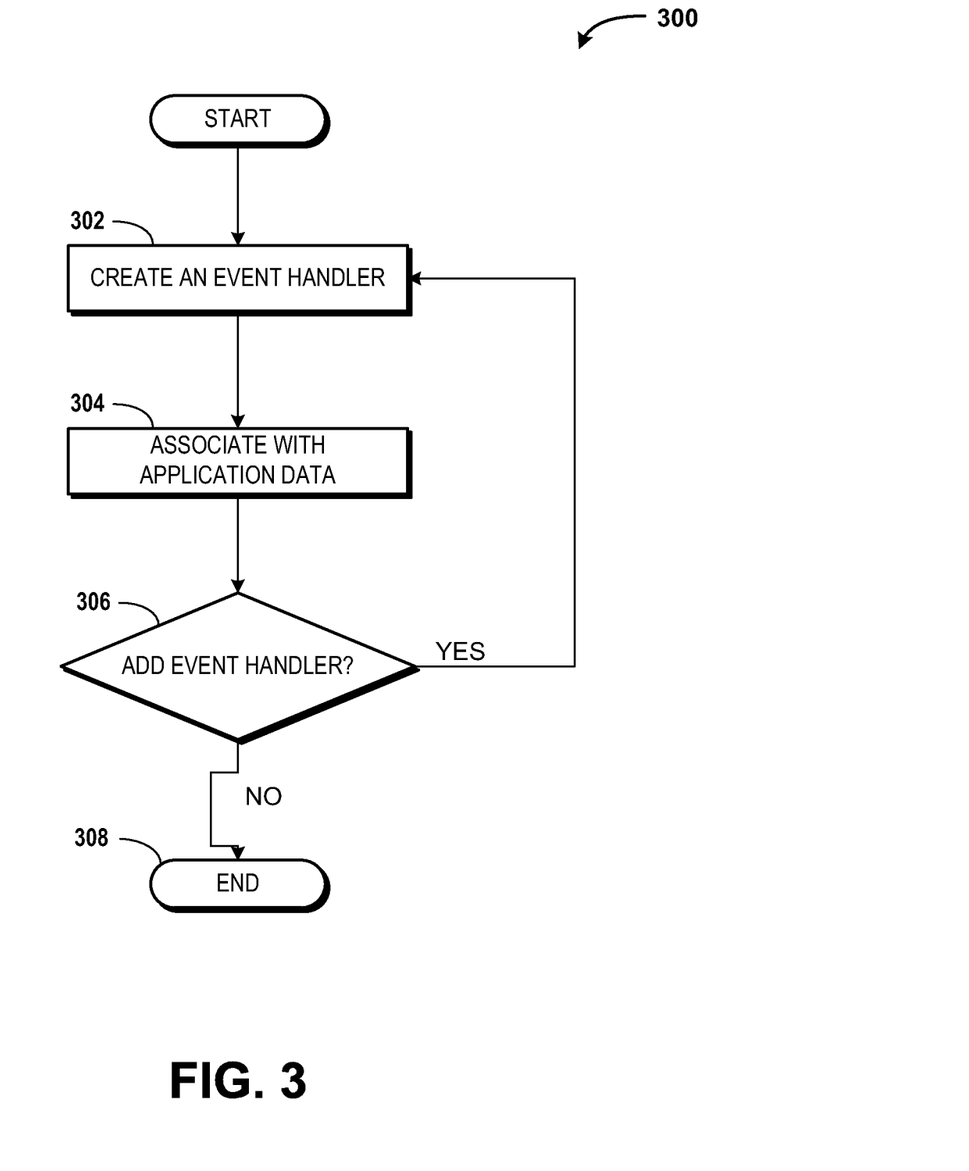
FIG. 3 is a flow diagram showing aspects of a method for creating event handlers, according to an exemplary embodiment.

Turning now to FIG. 3, aspects of a method 300 for creating event handlers will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods disclosed herein, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the server computer 102 via execution of the server application 106. It should be understood that these embodiments are exemplary, and should not be viewed as being limiting in any way. Additional and/or alternative devices can provide the functionality described herein via execution of additional and/or alternative applications. The method 300 begins at operation 302, wherein the server computer 102 creates an event handler. As explained above, it should be understood that a created event handler can be described by the application metadata 110.

According to some embodiments, the server application 106 is executable by the server computer 102 to present one or more UIs via which users or other entities create the event handlers via submission of one or more operations 120. More particularly, in some embodiments, a user or other entity enters data for creating the event handlers via the UI, the data for creating the event handlers is received by the server computer 102 as the operations 120, and the server computer 102 can store and create or update the application metadata 110 to reflect the event handlers. In some embodiments, the application metadata 110 describing the event handlers is cached in a data storage device such as a memory or cache until the user disconnects from the server computer 102 or otherwise commits the changes to the application metadata 110. It should be understood that a user or other entity can interact with the server computer 102 to create or configure event handlers at any time.

From operation 302, the method 300 proceeds to operation 304, wherein the server computer 102 associates the event handler to an event. Thus, as will be explained in more detail herein, occurrence of the event associated with or linked to the event handler can cause calling and/or execution of the event handler. As is explained in more detail herein with reference to FIG. 4, the server computer 102 can be configured to query the application metadata 110 in response to various events such as create, update, and/or delete operations on the application data 108. The server computer 102 can query the application metadata 110 to identify and invoke event handlers associated with the application data 108, which is described by the application metadata 110.

From operation 304, the method 300 proceeds to operation 306, wherein the server computer 102 determines if another event handler is to be created. For example, as explained above, a user may create one or more event handlers via interactions with the server computer 102 via one or more UIs. Thus, the user or other entity may create one or more event handlers at any particular time. If the server computer 102 determines in operation 306 that an additional event handler is to be created, the method 300 returns to operation 302 for creation of another event handler. It will be appreciated that if the event handlers are created via one or more UIs, that a determination that another event handler is to be created can include a determination that the one or more UIs have not been closed and/or that a user or other entity continues to interact with the one or more UIs. It should be understood that this embodiment is exemplary, and should not be construed as being limiting in any way.

The steps 302-306 can be iterated until the server computer 102 determines, in any iteration of operation 306, that additional event handlers are not to be created. If the server computer 102 determines in operation 306 that additional event handlers are not to be created, the method 300 proceeds to operation 308. The method 300 ends at operation 308.

Figure 4:
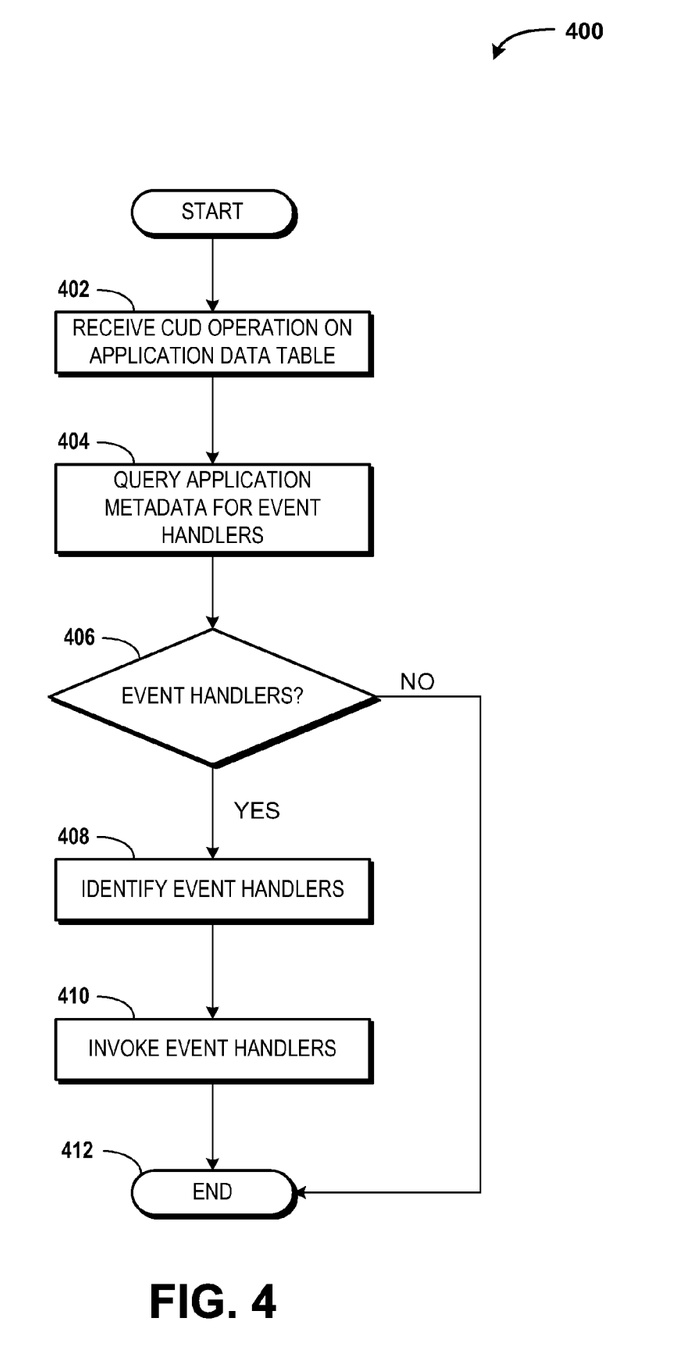
FIG. 4 is a flow diagram showing aspects of a method for providing metadata-based eventing supporting operations on data, according to an exemplary embodiment.

Turning now to FIG. 4, aspects of a method 400 for providing metadata-based eventing supporting operations on data will be described in detail. The method 400 begins at operation 402, wherein a CUD operation on a table corresponding to the application data 108 is received by the server computer 102. In one exemplary embodiment, a user or other entity submits an operation 120 to the server computer 102 for creating a customer or account in a customer or account table, which can be stored as or as part of the application data 108. The customer or account can be created via interactions with one or more UIs, if desired. In response to receiving one or more operations 120 for creating the customer or account, the server computer 102 can update the application data 108 to reflect the change.

From operation 402, the method 400 proceeds to operation 404, wherein the server computer 102 queries the application metadata 110 to identify event handlers associated with the operation 120 on the application data 108 received in operation 402. More particularly, the server computer 102 queries the application metadata 110 to determine if any event handlers associated with the operation 120 received by the server computer 102 are described by the application metadata 110. In the above exemplary embodiment, the server computer 102 queries the application metadata 110 to determine if the application metadata 110 describes any event handlers tied to creation of a customer in a customer table. It should be understood that this embodiment of customer creation is illustrative, and should not be construed as being limiting in any way.

From operation 404, the method 400 proceeds to operation 406, wherein the server computer 102 determines if the application metadata 110 describes any event handlers corresponding to the create, update, or delete operation 120 received in operation 402, a determination that can be based upon the query of the application metadata 110 as described above with regard to operation 404. If the application server 102 determines in operation 406 that event handlers corresponding to the create, update, or delete operation 120 received in operation 402 are described by the application metadata 110, the method 400 proceeds to operation 408, wherein the server computer 102 identifies the one or more event handlers corresponding to the create, update, or delete operation 120. Although not illustrated in FIG. 4, it should be clear from the description of FIG. 2 that any number of event handlers may be described by the application metadata 110 with respect to a particular operation 120. Thus, the operation 408 includes, in some embodiments, identifying more than one event handler and determining an order in which the event handlers are to be invoked.

Continuing the above example of creating a customer, the application metadata 110 corresponding to one or more customer tables can be linked to one or more event handlers for taking actions when customers are created. For example, if a new customer is created, an event handler may be invoked for updating a customer contact information database or spreadsheet, updating email lists for advertising or marketing information, generating messages or content for welcoming the new customer, other purposes, and the like. According to various embodiments, one or more orders in which the one or more event handlers corresponding to these and/or other actions are invoked can be specified or determined. In the above example, an event handler for invoking a mail program to send a welcome message to the customer may be invoked after an event handler for creating a customer account and associated customer number is invoked. Thus, the welcome message can include the created customer number. It should be understood that this embodiment is illustrative, and should not be construed as being limiting in any way.

From operation 408, the method 400 proceeds to operation 410, wherein the server computer 102 invokes the event handlers. More particularly, the server computer 102 can invoke the event handlers in one or more orders determined in operation 410, if desired. It should be understood that actions by one or more systems, devices, and/or other entities may be prompted via invoking the event handlers. From operation 410, or if the server computer 102 determines in operation 406 that event handlers corresponding to the create, update, or delete operation 120 received in operation 404 are not described by the application metadata 110, the method 400 proceeds to operation 412. The method 400 ends at operation 412.

Figure 5:
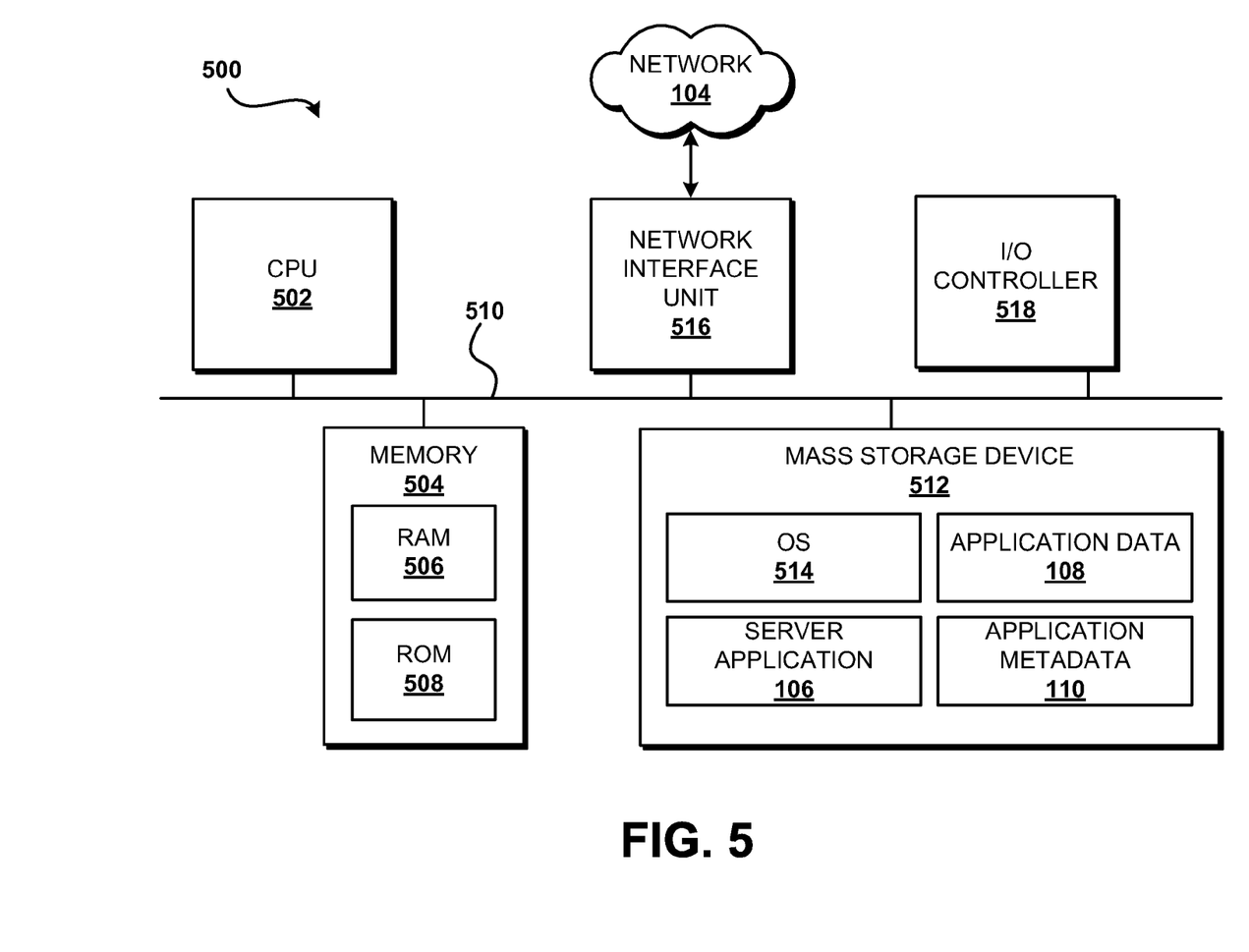
FIG. 5 is a computer architecture diagram illustrating an exemplary computer hardware and software architecture for a computing system capable of implementing aspects of the embodiments presented herein.

FIG. 5 illustrates an exemplary computer architecture 500 for a device capable of executing the software components described herein for providing metadata based eventing supporting operations on data. Thus, the computer architecture 500 illustrated in FIG. 5 illustrates an architecture for a mobile phone, a PDA, a smart phone, a server computer such as the server computer 102, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 514, the server application 106, the application data 108, and the application metadata 110.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 516 connected to the bus 510. It should be appreciated that the network interface unit 516 also may be utilized to connect to other types of networks and remote computer systems, for example, the application data repository 112, the client 114, and/or other devices, systems, and/or networks. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for providing metadata-based eventing supporting operations on data have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for invoking event handlers, the computer-implemented method comprising performing computer-implemented operations for:
   detecting an operation on application data associated with application metadata, the application data comprising a table having records, wherein the application data is published according to a publish and subscribe model, wherein the table includes references to one or more delegates comprising at least one of a pre-operation delegate or a post-operation delegate, and wherein one or more subscribers are notified if the operation on the application data is completed;
   in response to detecting the operation on the application data, determining if the application metadata comprises data describing one or more event handlers associated with the operation on the application data, wherein the one or more event handlers references one or more methods on a class; and
   in response to determining that the application metadata comprises the data describing the one or more event handlers, identifying the one or more event handlers and invoking the one or more event handlers, wherein invoking the one or more event handlers comprises, when the one or more event handlers comprise a plurality of event handlers, determining an order in which the plurality of event handlers are to be invoked, and invoking the plurality of event handlers in the order determined.

2. The method of claim 1, wherein the operation on the application data comprises creation of a new record in the table.

3. The method of claim 1, wherein the operation on the application data comprises at least one of updating and deletion of one of the records in the table.

4. The method of claim 1, wherein the operation on the application data comprises modifying one of the records in the table.

5. The method of claim 1, wherein the one or more event handlers are invoked via one or more delegates.

6. The method of claim 5, wherein determining if the application metadata comprises the one or more event handlers comprises querying the application metadata to determine if the one or more event handlers are associated with the table.

7. The method of claim 1, further comprising specifying the one or more event handlers.

8. The method of claim 7, wherein specifying the one or more event handlers comprises creating an event handler and associating the event handler with the table.

9. The method of claim 1, further comprising executing a method for each of the plurality of event handlers invoked.

10. A computer-implemented method for invoking event handlers, the computer-implemented method comprising performing computer-implemented operations for:
    receiving an operation for interacting with application data associated with application metadata, the application data comprising a table, wherein the application data is published according to a publish and subscribe model, and wherein the table includes references to one or more delegates comprising at least one of a pre-operation delegate or a post-operation delegate;
    modifying the application data in response to implementing the operation received, wherein one or more subscribers are notified if the operation on the application data is completed;
    in response to modifying the application data, determining if the application metadata comprises data describing one or more event handlers associated with the application data, wherein the one or more event handlers references one or more methods on a class;
    in response to determining that the application metadata comprises the data describing the one or more event handlers, identifying the one or more event handlers and invoking the event handlers to execute the one or more methods, wherein invoking the one or more event handlers comprises, when the one or more event handlers comprise a plurality of event handlers, determining an order in which the plurality of event handlers are to be invoked, and invoking the plurality of event handlers in the order determined.

11. The method of claim 10, wherein modifying the application data comprises modifying the table.

12. The method of claim 11, wherein determining if the application metadata comprises the data describing the one or more event handlers comprises querying the application metadata to determine if the one or more event handlers are associated with the table.

13. The method of claim 10, further comprising:
    specifying the one or more event handlers, wherein specifying the one or more event handlers comprises creating an event handler and associating the event handler with the application data; and
    storing data describing the event handler in the application metadata.

14. A computer storage medium having computer readable instructions stored thereupon that, when executed by a computer, cause the computer to:
    specify an event handler in application metadata associated with application data, wherein specifying the event handler comprises creating the event handler and associating the event handler with the application data, wherein the application data includes a table having records, wherein the application data is published according to a publish and subscribe model, and wherein the table includes references to one or more delegates comprising at least one of a pre-operation delegate or a post-operation delegate;

store the event handler with the application metadata;

receive an operation for interacting with the application data;

in response to receiving the operation, modify the application data, wherein one or more subscribers are notified if the operation on the application data is completed;

determine if the application metadata comprises data describing one or more event handlers associated with the application data, wherein the one or more event handlers references one or more methods on a class; and in response to determining that the application metadata comprises the data describing the one or more event handlers, identify the one or more event handlers, and invoke the one or more event handlers, wherein invoking the one or more event handlers comprises, when the one or more event handlers comprise a plurality of event handlers, determining an order in which the plurality of event handlers are to be invoked, and invoking the plurality of event handlers in the order determined.

15. The computer storage medium of claim 14, wherein modifying the application data comprises at least one of creating, updating, or deleting a record stored in the table.

16. The computer storage medium of claim 15, wherein determining if the application metadata comprises the data describing the one or more event handlers comprises generating a query of the application metadata to determine if the one or more event handlers is associated with the application data.

\* \* \* \* \*